(12) United States Patent
Levy et al.

(10) Patent No.: US 8,000,495 B2
(45) Date of Patent: Aug. 16, 2011

(54) DIGITAL WATERMARKING SYSTEMS AND METHODS

(75) Inventors: Kenneth L. Levy, Stevenson, WA (US); Geoffrey B. Rhoads, West Linn, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 12/251,362

(22) Filed: Oct. 14, 2008

(65) Prior Publication Data

US 2009/0129627 A1 May 21, 2009

Related U.S. Application Data

(60) Continuation of application No. 10/843,866, filed on May 11, 2004, now Pat. No. 7,436,976, which is a division of application No. 10/278,742, filed on Oct. 21, 2002, now Pat. No. 7,006,661, said application No. 10/843,866 is a continuation-in-part of application No. 10/017,678, filed on Dec. 13, 2001, now Pat. No. 7,050,603, which is a continuation of application No. 09/597,209, filed on Jun. 20, 2000, now Pat. No. 6,411,725, which is a continuation-in-part of application No. 09/408,902, filed on Sep. 29, 1999, now Pat. No. 6,408,331, which is a division of application No. 09/130,624, filed on Aug. 6, 1998, now Pat. No. 6,324,573, which is a continuation of application No. 08/508,083, filed on Jul. 27, 1995, now Pat. No. 5,841,978.

(60) Provisional application No. 60/349,970, filed on Oct. 19, 2001.

(51) Int. Cl.
*G06K 9/00* (2006.01)
*G06K 9/46* (2006.01)
*H04N 7/167* (2011.01)

(52) U.S. Cl. .................. 382/100; 382/233; 380/203

(58) Field of Classification Search .................. 382/100, 382/232; 713/193, 176, 189, 179, 180, 194; 380/28, 284; 705/54, 51
See application file for complete search history.

(56) References Cited

U.S. PATENT DOCUMENTS 5,530,751 A 6/1996 Morris
(Continued)

FOREIGN PATENT DOCUMENTS

EP 1202250 5/2002
(Continued)

OTHER PUBLICATIONS

Shelby Pereira, Joseph J. K. O. Ruanaidh, Frederic Deguillaume, Gabriela Csurka, Thierry Pun, and Joseph J. K. O. Ruanaidh. 1999. Template Based Recovery of Fourier-Based Watermarks Using Log-polar and Log-log Maps. In Proceedings of the IEEE International Conference on Multimedia Computing and Systems—vol. 2 (ICMCS '99), vol. 2.*

(Continued)

*Primary Examiner* — Vu Le
*Assistant Examiner* — Andrae S Allison

(57) ABSTRACT

The present invention relates to watermarking of compressed audio or video files. One claim recites a method including: obtaining a copy of a compressed audio or video file; decompressing the compressed audio or video file to yield decompressed audio or video content; determining a first watermarking component for the decompressed audio or video content, the first watermarking component intended to be steganographically hidden in the audio or video content; storing the first digital watermarking component separately from the compressed audio or video file; and then providing the stored first watermarking component, a unique plural-bit watermark identifier, and the compressed audio or video file to a remote location. Other claims and combinations are provided as well.

17 Claims, 3 Drawing Sheets

U.S. PATENT DOCUMENTS

| | | | |
|---|---|---|---|
| 5,530,759 A | 6/1996 | Braudaway et al. | |
| 5,636,292 A | 6/1997 | Rhoads | |
| 5,646,997 A | 7/1997 | Barton | |
| 5,652,626 A | 7/1997 | Kawakami et al. | |
| 5,687,191 A | 11/1997 | Lee et al. | |
| 5,687,236 A | 11/1997 | Moskowitz et al. | |
| 5,710,834 A | 1/1998 | Rhoads | |
| 5,727,092 A | 3/1998 | Sandford, II et al. | |
| 5,745,604 A | 4/1998 | Rhoads | |
| 5,809,139 A | 9/1998 | Girod et al. | |
| 5,822,436 A | 10/1998 | Rhoads | |
| 5,832,119 A | 11/1998 | Rhoads | |
| 5,841,886 A | 11/1998 | Rhoads | |
| 5,841,978 A | 11/1998 | Rhoads | |
| 5,848,155 A | 12/1998 | Cox | |
| 5,859,920 A | 1/1999 | Daly et al. | |
| 5,862,260 A | 1/1999 | Rhoads | |
| 5,901,178 A | 5/1999 | Lee et al. | |
| 5,905,819 A | 5/1999 | Daly | |
| 5,930,369 A | 7/1999 | Cox et al. | |
| 5,949,055 A | 9/1999 | Fleet et al. | |
| 5,960,081 A | 9/1999 | Vynne et al. | |
| 6,018,593 A | 1/2000 | Yamagata | |
| 6,061,793 A | 5/2000 | Tewfik et al. | |
| 6,069,914 A | 5/2000 | Cox | |
| 6,108,434 A | 8/2000 | Cox et al. | |
| 6,122,403 A | 9/2000 | Rhoads | |
| 6,154,571 A | 11/2000 | Cox et al. | |
| 6,185,312 B1 | 2/2001 | Nakamura et al. | |
| 6,208,745 B1 | 3/2001 | Florencio et al. | |
| 6,222,932 B1 | 4/2001 | Rao et al. | |
| 6,226,387 B1 | 5/2001 | Tewfik et al. | |
| 6,229,924 B1 | 5/2001 | Rhoads et al. | |
| 6,246,777 B1 | 6/2001 | Agarwal et al. | |
| 6,266,419 B1 | 7/2001 | Lacy et al. | |
| 6,275,599 B1 | 8/2001 | Adler et al. | |
| 6,282,299 B1 | 8/2001 | Tewfik et al. | |
| 6,282,300 B1 | 8/2001 | Bloom et al. | |
| 6,285,774 B1 * | 9/2001 | Schumann et al. | 382/100 |
| 6,285,775 B1 | 9/2001 | Wu et al. | |
| 6,304,345 B1 | 10/2001 | Patton | |
| 6,307,949 B1 | 10/2001 | Rhoads | |
| 6,311,214 B1 | 10/2001 | Rhoads | |
| 6,314,192 B1 | 11/2001 | Chen et al. | |
| 6,332,031 B1 | 12/2001 | Rhoads et al. | |
| 6,332,194 B1 | 12/2001 | Bloom | |
| 6,334,187 B1 | 12/2001 | Kadono | |
| 6,373,960 B1 | 4/2002 | Conover et al. | |
| 6,381,341 B1 | 4/2002 | Rhoads | |
| 6,385,329 B1 | 5/2002 | Sharma et al. | |
| 6,404,898 B1 | 6/2002 | Rhoads | |
| 6,408,082 B1 | 6/2002 | Rhoads et al. | |
| 6,411,725 B1 | 6/2002 | Rhoads | |
| 6,418,421 B1 * | 7/2002 | Hurtado et al. | 705/54 |
| 6,421,070 B1 | 7/2002 | Ramos et al. | |
| 6,424,725 B1 | 7/2002 | Rhoads et al. | |
| 6,427,020 B1 | 7/2002 | Rhoads | |
| 6,434,253 B1 | 8/2002 | Hayashi et al. | |
| 6,449,380 B1 | 9/2002 | Acharya et al. | |
| 6,493,457 B1 | 12/2002 | Quackenbush et al. | |
| 6,512,835 B1 | 1/2003 | Numao et al. | |
| 6,516,079 B1 | 2/2003 | Rhoads et al. | |
| 6,522,770 B1 | 2/2003 | Seder et al. | |
| 6,535,617 B1 | 3/2003 | Hannigan et al. | |
| 6,542,927 B2 | 4/2003 | Rhoads | |
| 6,553,129 B1 | 4/2003 | Rhoads | |
| 6,563,937 B1 | 5/2003 | Wendt | |
| 6,567,533 B1 | 5/2003 | Rhoads | |
| 6,571,144 B1 | 5/2003 | Moses et al. | |
| 6,580,808 B2 | 6/2003 | Rhoads | |
| 6,590,996 B1 | 7/2003 | Reed et al. | |
| 6,606,540 B1 * | 8/2003 | Gross | 700/258 |
| 6,611,607 B1 | 8/2003 | Davis et al. | |
| 6,614,914 B1 | 9/2003 | Rhoads et al. | |
| 6,631,198 B1 | 10/2003 | Hannigan et al. | |
| 6,636,615 B1 | 10/2003 | Rhoads et al. | |
| 6,647,128 B1 | 11/2003 | Rhoads | |
| 6,647,130 B2 | 11/2003 | Rhoads | |
| 6,650,761 B1 | 11/2003 | Rodriguez et al. | |
| 6,665,418 B1 | 12/2003 | Honsinger | |
| 6,674,802 B2 | 1/2004 | Knee et al. | |
| 6,678,390 B1 | 1/2004 | Honsinger | |
| 6,681,028 B2 | 1/2004 | Rhoads et al. | |
| 6,681,029 B1 | 1/2004 | Rhoads | |
| 6,694,042 B2 | 2/2004 | Seder et al. | |
| 6,694,043 B2 | 2/2004 | Seder et al. | |
| 6,700,990 B1 | 3/2004 | Rhoads | |
| 6,700,995 B2 | 3/2004 | Reed | |
| 6,704,869 B2 | 3/2004 | Geoffrey et al. | |
| 6,718,046 B2 | 4/2004 | Reed et al. | |
| 6,718,047 B2 | 4/2004 | Rhoads | |
| 6,721,440 B2 | 4/2004 | Reed et al. | |
| 6,721,459 B1 | 4/2004 | Honsinger et al. | |
| 6,728,390 B2 | 4/2004 | Rhoads et al. | |
| 6,735,699 B1 * | 5/2004 | Sasaki et al. | 726/28 |
| 6,744,906 B2 | 6/2004 | Rhoads et al. | |
| 6,760,463 B2 | 7/2004 | Rhoads | |
| 6,763,123 B2 | 7/2004 | Reed et al. | |
| 6,768,809 B2 | 7/2004 | Rhoads et al. | |
| 6,768,980 B1 | 7/2004 | Meyer et al. | |
| 6,775,392 B1 | 8/2004 | Rhoads | |
| 6,798,894 B2 | 9/2004 | Rhoads | |
| 6,813,366 B1 | 11/2004 | Rhoads | |
| 6,879,701 B1 | 4/2005 | Rhoads | |
| 6,917,724 B2 | 7/2005 | Seder et al. | |
| 6,920,232 B2 | 7/2005 | Rhoads | |
| 6,922,480 B2 | 7/2005 | Rhoads | |
| 6,947,571 B1 | 9/2005 | Rhoads et al. | |
| 6,961,444 B2 | 11/2005 | Levy | |
| 6,975,746 B2 | 12/2005 | Davis et al. | |
| 6,988,202 B1 | 1/2006 | Rhoads et al. | |
| 6,996,252 B2 | 2/2006 | Reed et al. | |
| 6,996,717 B2 * | 2/2006 | Yin et al. | 713/176 |
| 7,003,731 B1 | 2/2006 | Rhoads et al. | |
| 7,006,661 B2 | 2/2006 | Miller et al. | |
| 7,013,021 B2 | 3/2006 | Sharma et al. | |
| 7,024,016 B2 | 4/2006 | Rhoads et al. | |
| 7,027,614 B2 | 4/2006 | Reed | |
| 7,035,427 B2 | 4/2006 | Rhoads | |
| 7,044,395 B1 | 5/2006 | Rhoads et al. | |
| 7,050,603 B2 | 5/2006 | Rhoads | |
| 7,051,086 B2 | 5/2006 | Rhoads et al. | |
| 7,054,465 B2 | 5/2006 | Rhoads | |
| 7,062,069 B2 | 6/2006 | Rhoads | |
| 7,095,871 B2 | 8/2006 | Jones et al. | |
| 7,111,170 B2 | 9/2006 | Rhoads et al. | |
| 7,113,614 B2 | 9/2006 | Rhoads | |
| 7,116,781 B2 | 10/2006 | Rhoads | |
| 7,139,408 B2 | 11/2006 | Rhoads et al. | |
| 7,142,691 B2 * | 11/2006 | Levy | 382/100 |
| 7,158,654 B2 | 1/2007 | Rhoads | |
| 7,159,000 B2 * | 1/2007 | Plastina et al. | 707/104.1 |
| 7,164,780 B2 | 1/2007 | Brundage et al. | |
| 7,171,016 B1 | 1/2007 | Rhoads | |
| 7,171,020 B2 | 1/2007 | Rhoads et al. | |
| 7,174,031 B2 | 2/2007 | Rhoads et al. | |
| 7,177,443 B2 | 2/2007 | Rhoads | |
| 7,213,757 B2 | 5/2007 | Jones et al. | |
| 7,224,819 B2 | 5/2007 | Levy et al. | |
| 7,248,717 B2 | 7/2007 | Rhoads | |
| 7,254,838 B2 * | 8/2007 | Kim et al. | 726/29 |
| 7,261,612 B1 | 8/2007 | Hannigan et al. | |
| 7,305,104 B2 | 12/2007 | Carr et al. | |
| 7,308,110 B2 | 12/2007 | Rhoads | |
| 7,313,251 B2 | 12/2007 | Rhoads | |
| 7,319,775 B2 | 1/2008 | Sharma et al. | |
| 7,327,936 B2 | 2/2008 | Lecomte | |
| 7,330,564 B2 | 2/2008 | Brundage et al. | |
| 7,346,472 B1 | 3/2008 | Moskowitz et al. | |
| 7,352,878 B2 | 4/2008 | Reed et al. | |
| 7,369,678 B2 | 5/2008 | Rhoads | |
| 7,377,421 B2 | 5/2008 | Rhoads | |
| 7,391,880 B2 | 6/2008 | Reed et al. | |
| 7,400,743 B2 | 7/2008 | Rhoads et al. | |
| 7,406,214 B2 | 7/2008 | Rhoads et al. | |
| 7,412,151 B1 | 8/2008 | Kalker et al. | |
| 7,424,131 B2 | 9/2008 | Alattar et al. | |

| Patent/Pub No. | Date | Name |
|---|---|---|
| 7,427,030 B2 | 9/2008 | Jones et al. |
| 7,428,755 B2 | 9/2008 | Lecomte |
| 7,433,491 B2 | 10/2008 | Rhoads |
| 7,434,056 B2 * | 10/2008 | Belenko et al. ............... 713/176 |
| 7,436,976 B2 | 10/2008 | Levy |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,454,035 B2 | 11/2008 | Miller et al. |
| 7,460,684 B2 | 12/2008 | Srinivasan |
| 7,460,726 B2 | 12/2008 | Levy et al. |
| 7,466,840 B2 | 12/2008 | Rhoads |
| 7,486,799 B2 | 2/2009 | Rhoads |
| 7,499,566 B2 | 3/2009 | Rhoads |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,564,992 B2 | 7/2009 | Rhoads |
| RE40,919 E | 9/2009 | Rhoads |
| 7,602,978 B2 | 10/2009 | Levy et al. |
| 7,620,253 B2 | 11/2009 | Miller et al. |
| 7,628,320 B2 | 12/2009 | Rhoads |
| 7,630,511 B2 | 12/2009 | Zhao et al. |
| 7,643,649 B2 | 1/2010 | Davis et al. |
| 7,650,008 B2 | 1/2010 | Rhoads |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,902 B2 | 7/2010 | Rhoads |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 2001/0021260 A1 | 9/2001 | Chung et al. |
| 2001/0034705 A1 | 10/2001 | Rhoads et al. |
| 2001/0052076 A1 | 12/2001 | Kadono |
| 2001/0055407 A1 | 12/2001 | Rhoads |
| 2002/0009208 A1 | 1/2002 | Alattar et al. |
| 2002/0051559 A1 | 5/2002 | Noda et al. |
| 2002/0066019 A1 | 5/2002 | Amonou et al. |
| 2002/0083324 A1 * | 6/2002 | Hirai ............................ 713/176 |
| 2002/0083469 A1 | 6/2002 | Jeannin et al. |
| 2002/0097891 A1 | 7/2002 | Hinishi |
| 2002/0106106 A1 | 8/2002 | Sato |
| 2002/0129253 A1 | 9/2002 | Langelaar |
| 2002/0131076 A1 | 9/2002 | Davis |
| 2002/0167427 A1 | 11/2002 | Furuta |
| 2002/0168082 A1 | 11/2002 | Razdan |
| 2002/0168086 A1 | 11/2002 | Sugahara |
| 2002/0176003 A1 | 11/2002 | Seder et al. |
| 2002/0176602 A1 | 11/2002 | Acharya et al. |
| 2002/0178368 A1 | 11/2002 | Yin et al. |
| 2002/0186886 A1 | 12/2002 | Rhoads |
| 2002/0194480 A1 | 12/2002 | Nagao |
| 2002/0196272 A1 | 12/2002 | Ramos et al. |
| 2003/0040957 A1 | 2/2003 | Rhoads et al. |
| 2003/0105730 A1 | 6/2003 | Davis et al. |
| 2003/0130954 A1 | 7/2003 | Carr et al. |
| 2004/0005093 A1 | 1/2004 | Rhoads |
| 2004/0190750 A1 | 9/2004 | Rodriguez et al. |
| 2004/0223626 A1 | 11/2004 | Honsinger et al. |
| 2004/0240704 A1 | 12/2004 | Reed |
| 2004/0264733 A1 | 12/2004 | Rhoads et al. |
| 2005/0025336 A1 | 2/2005 | Lubin et al. |
| 2005/0030588 A1 | 2/2005 | Reese et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0276841 A1 | 11/2007 | Rhoads et al. |
| 2007/0276928 A1 | 11/2007 | Rhoads et al. |
| 2008/0091288 A1 | 4/2008 | Srinivasan |
| 2008/0121728 A1 | 5/2008 | Rodriguez |
| 2008/0133555 A1 | 6/2008 | Rhoads et al. |
| 2008/0276286 A1 | 11/2008 | Robinson et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0054529 A1 | 3/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Ellingson et al. |
| 2010/0172540 A1 | 7/2010 | Davis et al. |
| 2010/0198941 A1 | 8/2010 | Rhoads |
| 2010/0296526 A1 | 11/2010 | Rhoads |
| 2011/0007936 A1 | 1/2011 | Rhoads |

FOREIGN PATENT DOCUMENTS

| | | |
|---|---|---|
| WO | WO9625005 | 8/1996 |
| WO | WO0074371 | 12/2000 |
| WO | WO0203385 | 1/2002 |
| WO | WO0249363 | 6/2002 |
| WO | WO02060182 | 8/2002 |
| WO | WO02084990 | 10/2002 |
| WO | WO03065731 | 8/2003 |

OTHER PUBLICATIONS

U.S. Appl. No. 08/635,531, filed Apr. 25, 1996, Geoffrey B. Rhoads.
U.S. Appl. No. 09/413,117, filed Oct. 6, 1999, Geoffrey B. Rhoads.
U.S. Appl. No. 09/507,096, filed Feb. 17, 2000, Geoffrey B. Rhoads et al.
U.S. Appl. No. 12/912,461, filed Oct. 26, 2010, Adnan M. Alattar.
U.S. Appl. No. 09/482,749, filed Jan. 13, 2000, Geoffrey B. Rhoads.
U.S. Appl. No. 09/234,780, filed Jan. 20, 1999, Geoffrey B. Rhoads.
U.S. Appl. No. 09/343,104, filed Jun. 29, 1999, Tony F. Rodriguez et al.
U.S. Appl. No. 09/697,009, filed Oct. 25, 2000, Bruce L. Davis et al.
U.S. Appl. No. 09/967,015, filed Oct. 25, 2000, Bruce L. Davis.
U.S. Appl. No. 09/633,587, filed Aug. 7, 2000, Geoffrey B. Rhoads et al.
U.S. Appl. No. 09/567,405, filed May 8, 2000, Geoffrey B. Rhoads et al.
U.S. Appl. No. 09/689,289, filed Oct. 11, 2000, Geoffrey B. Rhoads et al.
U.S. Appl. No. 09/629,649, filed Aug. 1, 2000, J. Scott Carr et al.
U.S. Appl. No. 09/552,998, filed Apr. 19, 2000, Tony F. Rodriguez et al.
U.S. Appl. No. 09/343,101, filed Jun. 29, 1999, Bruce L. Davis et al.
U.S. Appl. No. 12/953,190, filed Nov. 23, 2010, Geoffrey B. Rhoads.
U.S. Appl. No. 09/538,493, filed Mar. 30, 2000, Geoffrey B. Rhoads.
Autrusseau et al., "A Psychovisual Approach for Watermarking", Proceedings of SPIE vol. 4314, 2001, pp. 495-504.
Cox, et al., "Using Perceptual Models," Chapter 7 of Digital Watermarking, 2002, pp. 201-240.
Fleet et al., "Embedding Invisible Information in Color Images," IEEE Int. Conf. on Image Proc., Oct. 1997, vol. 1, pp. 532, 535.
Hartung et al., "Digital Watermarking of MPEG-4 Facial Animation Parameters," Computers & Graphics, vol. 22, No. 3, 1998, 17 pages.

Hartung et al., Digital Watermarking of Raw and Compressed Video, Proc. SPIE 2952, Digital Compression Technologies and Systems for Video Communications, Oct. 1996, pp. 205-213.

Hartung, et al., "Watermarking of uncompressed and compressed video," Signal Processing, vol. 66, No. 3, pp. 283-301, May 1998.

Lin et al., "Rotation, Scale, and Translation Resilient Watermarking for Images," IEEE Transactions on Image Processing, vol. 10, No. 5, May 2001, pp. 767-782.

ÓRuanaidh, "Rotation, Scale and Translation Invariant Digital Image Watermarking," Proceedings of the International Conference of Image Processing, vol. I, Signal Processing, pp. 536-539, 1997.

ÓRuanaidh, "Rotation, Scale and Translation Invariant Spread Spectrum digital Image watermarking," Signal Processing 66, pp. 303-317, 1998.

Podilchuk et al., "Image-Adaptive Watermarking Using Visual Models", Feb. 19, 1998, 37 pages.

Robert et al., "Masking Models and Watermark unDetection", Proceeding of SPIE, vol. 4314, 2001, pp. 455-467.

Sheng, "Experiments on Pattern Recognition Using Invariant Fourier-Mellin Descriptors," Journal of Optical Society of America, vol. 3, No. 6, pp. 771-776, 1986.

Su et al., "Synchronized Detection of the Block-based Watermark with Invisible Grid Embedding," Proc. SPIE vol. 4314: Security and Watermarking of Multimedia Contents III, Jan. 2001, pp. 406-417.

Wu et al., Object-Based Multiresolution Watermarking of Images and Video, ISCAS 2000—IEEE International Symposium on Circuits and Systems, May 28-31, 2000, 2000 IEEE, pp. 1212-1215.

Yong Ju Jung, et al., "Novel Watermark Embedding Technique Based on Human Visual system", Proceeding of SPIE vol. 4314, 2001, pp. 475-482.

* cited by examiner

DIGITAL WATERMARKING SYSTEMS AND METHODS

RELATED APPLICATION DATA

The present application is a continuation of U.S. patent application Ser. No. 10/843,866, filed May 11, 2004 (now U.S. Pat. No. 7,436,976) which is a division of U.S. patent application Ser. No. 10/278,742, filed Oct. 21, 2002 (now U.S. Pat. No. 7,006,661), which claims the benefit of U.S. Provisional Patent Application No. 60/349,970, filed Oct. 19, 2001. Application Ser. No. 10/843,866 is also a continuation-in-part of U.S. patent application Ser. No. 10/017,678, filed Dec. 13, 2001 (now U.S. Pat. No. 7,050,603), which is a continuation of U.S. patent application Ser. No. 09/597,209 (now U.S. Pat. No. 6,411,725). The Ser. No. 09/597,209 application is a continuation-in-part of U.S. patent application Ser. No. 09/408,902 (now U.S. Pat. No. 6,408,331), which is a division of U.S. patent application Ser. No. 09/130,624 (now U.S. Pat. No. 6,324,573), which is a continuation of U.S. patent application Ser. No. 08/508,083 (now U.S. Pat. No. 5,841,978).

BACKGROUND AND SUMMARY OF THE INVENTION

In a recent article, "Paranoid Hollywood Wracked by Hack Attacks," author Marc Graser reported that "[h]ollywood is experiencing the revelation that everything it saves on a computer is available to prying eyes at any time. Nothing is safe. Paranoia is running rampant. Through legal (and freely accessible) software, anyone with a computer and an Internet connection can enter studio databases containing the most private information." (Reuters distributed Graser's article on Aug. 8, 2001.).

Graser continued "[r]ecent breaches have allowed hackers to exchange: rough-cuts of Warner Bros.' "Ocean's 11" and Columbia Pictures' Jet Li actioner "The One"; emails among executives at Warner Bros. TV; scripts transferred from production companies such as Bruckheimer Films; databases at agencies like Creative Artists Agency, Endeavor and William Morris; personal records at law corporations and accounting offices; and digitally stored media at New Line and VDI Multimedia." (See id.).

Piracy is raking showbiz in the tune of $1 trillion in damages annually. The film industry is losing $2.5 billion a year to piracy and the music industry is losing an additional $4.1 billion per year. (See id.).

Yet the biggest threat comes from money-hungry professionals, and company employees are increasingly to blame. See id. Graser reports that most companies do not realize that 90% of the attacks performed on the systems they try so hard to protect are the result of inside jobs.

A solution is needed to help curve the onslaught of movie theft and piracy, particularly theft from film studios and editing facilities.

Digital Watermarking can provide a deterrence and tracking solution.

Digital watermarking technology, a form of stenography, encompasses a great variety of techniques by which plural bits of digital data are hidden in some other object, preferably without leaving human-apparent evidence of alteration.

Digital watermarking may be used to modify media content (audio, video, images, etc.) to embed a machine-readable code into the media content. The media may be modified such that the embedded code is imperceptible or nearly imperceptible to a viewer, yet may be detected through an automated detection process.

There are many processes by which media content can be processed to encode a digital watermark. In media (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present Assignee's U.S. Pat. No. 6,122,403 and application Ser. No. 09/503,881 (now U.S. Pat. No. 6,614,914) are illustrative of certain watermarking technologies. Of course, artisans in the digital watermarking field are familiar with other technologies that are suitably interchangeable with some aspects of the present invention.

Digital watermarking systems typically have two primary components: an embedding component that embeds a watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The Assignee's U.S. patent application Ser. Nos. 09/503,881 (now U.S. Pat. No. 6,614,914) and 09/452,023 (now U.S. Pat. No. 6,408,082) detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

To provide a comprehensive disclosure without unduly lengthening this specification, each of the patents and patent applications cited in this document are hereby incorporated by reference.

In one implementation of the invention, we provide stenographic markings for studio rough cuts. The marks provide nearly imperceptible identification and forensic tracking clues.

In another implementation, content is marked with serialized or unique codes efficiently using different objects for the content and watermark data via object based encoding systems such as MPEG-4. The watermark object can be efficiently created if the original compressed content is analyzed and perceptual model results and calibration signals that are constant when a watermark payload is changed are saved. This or another forensic embedding system can be used to track content as well as lock content to a recipient. For example, the content may be rendered only if the individual or their rendering device has a secret code that coincides with the embedded ID.

With the foregoing by way of background and summary, the specification next turns to various digital watermarking improvements. It will be recognized that these improvements can typically be employed in many applications, and in various combinations with the subject matter of the patent documents cited herein. These improvements will be more readily apparent from the following detailed description, which proceeds with reference to the accompanying drawings.

DETAILED DESCRIPTION

Figure 1:
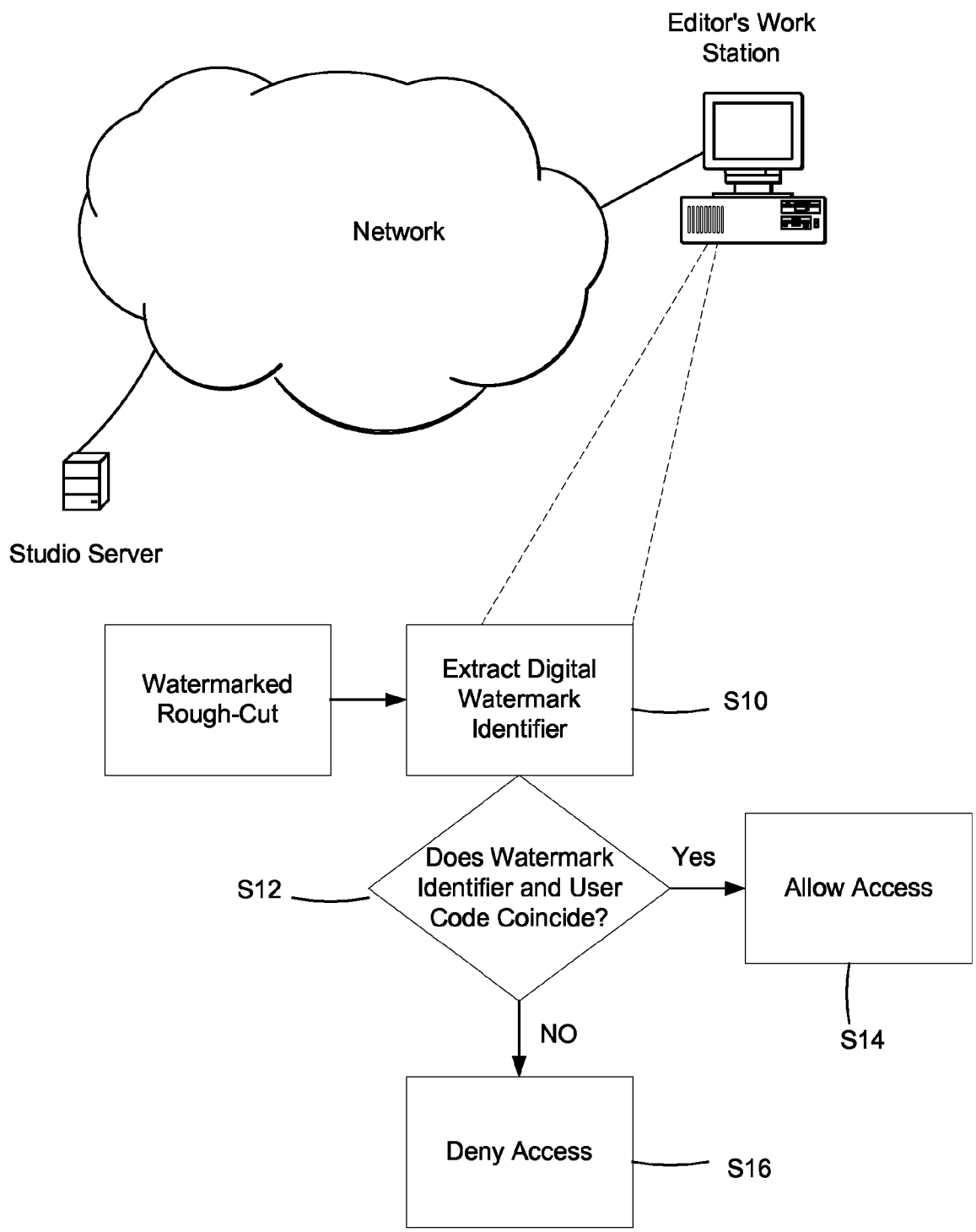
FIG. 1 is a diagram illustrating a network system, including a flow diagram for a security procedure.

Consider a typical film production process. After shooting on location, the resulting film is digitized or converted to a digital format. (Or digital images can be initially captured. Of course, there are special effects and other effects filters (e.g., a flame effect filter) that are essentially produced in the digital domain.). The digitized film (and any special effects scenes) represents the many scenes that will be edited to create a movie, video or other viewing program. We refer to this collection of digital scenes as a "master cut." This master cut can be further refined into so-called rough-cuts, in which a movie sequence begins to take shape.

Often, rough-cuts are provided to editors and effects specialists. Similarly, rough-cuts are often provided to directors, critics, executives, advertisers, etc. One aspect of the present invention helps to identify and track rough-cuts as they are distributed from a studio.

A conventional security feature provides a digital "bug" or label that visually appears in a corner (or other) screen position of a rough-cut. Or the rough-cut includes a visible banner-like text message throughout each scene or frame. These techniques are easily defeated by pirates through simple cropping and editing techniques.

According to one aspect of the present invention, a rough-cut is digitally watermarked, particularly when communicated to a non-secure location. Even rough-cut copies that are "checked-out" as a file, instead of rendering (or streaming) to a network workstation, can be digitally watermarked. The digital watermark is preferably redundantly embedded throughout the rough-cut, or the watermark can be placed in only specific frames or placed to cover certain film segments or video objects. Preferably, the digital watermark includes an identifier. Suitable watermarking techniques are disclosed in the applications and patents mentioned above. In some implementations, other digital watermarking techniques can be suitably interchanged with this aspect of the present invention, so long as the watermark conveys sufficient payload capacity.

A digital watermark identifier preferably uniquely identifies a rough-cut version (e.g., cut 1 of 12, date/time, editing details, distribution trail, etc.). Alternatively (or additionally), the identifier uniquely identifies a party to which the rough-cut is being transferred. The identifier is stored in a database or other record to facilitate tracking. The identifier is associated in the database with information relating to the rough-cut or to the receiving party. (The data record can include additional information such as time of rough-cut checkout, distribution/rendering channel, usage restrictions, etc.). Thereafter, when the rough-cut is found in an unexpected or unauthorized location, e.g., a web site, video store shelf, competitor's studio, counterfeited DVD, etc., the embedded watermark identifier is extracted and used to interrogate the database. The database information is retrieved and the source of the leak or distribution channel can be identified.

In another embodiment, the identifier is used as a security feature to prevent unauthorized viewing or handling. With reference to FIG. 1, a rough-cut is transferred from a network studio to a user workstation (e.g., editor, director, etc.) via a network. The transfer can occur through a conventional network, such as a wide area network, local area network, private network, wireless network, or even the Internet. Alternatively, the user receives the rough-cut on physical media. The rough-cut includes a digital watermark embedded therein. Of course, a digital watermark can be redundantly embedded throughout the cut.

Access to the rough-cut is regulated by a software security application operating on the user's workstation. The software security application can be integrated with software editing tools such as Adobe Premier, Affects Effects and Media100 products, among others. The security software preferably includes (or cooperates with) a digital watermark reader. The reader can be a plug-in or an independent software application. The watermark reader extracts the digital watermark identifier (S10) from the rough-cut and the user is prompted to enter a corresponding code. The code is preferably rough-cut specific in that a user has (or receives from a studio) a code that corresponds only to a digital watermark identifier embedded in her rough-cut. Once entered, the watermark detector determines whether the identifier and code coincide (S12). If the code and watermark identifier coincide, the user is granted access to the rough-cut (S14). Else, the user is denied access (S16). The code and watermark ID need not perfectly match to coincide. Indeed, the code and identifier can be related via a hash, mathematical relationship or algorithm. Or the code/identifier can be related by a symmetrical or asymmetrical encryption key.

In other implementations, the code is cached on the editor's computer (or video rendering device), e.g., like storing so-called web cookies that securely store account IDs and passwords on a user's terminal, so the code does not need to be manually entered each time. In addition, the code can be locked (or tied) to a computer, such as including the date of a Windows garbage can. In one implementation, the computer is secure, requiring the user to enter a password and/or pass biometrics, such as a fingerprint scan or security dongle or card, such that other users do not have access to the cached ID. In other words, only a specified user can use the cached ID, even though it is stored on the PC since the cache is locked for access only by a qualifying PC user. In another implementation, the code is implicitly part of a computer system, such as a private cryptography key. In this case, the code is used to decrypt or otherwise unscramble the rough-cut or the digital watermark embedded in the rough cut or both.

As will be appreciated, an editing process typically involves the creation of an instruction set, which is used to create a final cut. The instruction set outlines (e.g., by codes or markers) the editor's edits, cuts, etc. Most often the instruction set is applied against a high quality cut to create the final cut (or further rough-cuts). Of course, a final cut can likewise be watermarked.

In still another implementation of this aspect of the present invention, an editor's rendering device (e.g., personal computer executing editing software instructions, set-top-box or other device) embeds a watermark identifier in a rough-cut. The identifier is preferably unique to the editor or to a team of editors. Accordingly, if the rough-cut is discovered in an unanticipated or unauthorized channel, the watermark identifier, once extracted, can be used to track the source of the leak.

Consider a modification of this implementation for adaptation to a peer-to-peer (P2P) network environment. When presenting a pre-release movie clip in a P2P network, e.g., like x-ShareThis, every ShareThis client that handles (or routes) the movie clip digitally watermarks the clip with a unique identifying watermark (e.g., a unique serial number, etc.). Illegal or unauthorized copies of the movie clip can be traced through the peer lineage of the unique identifiers.

Transactional Watermarks: A System Level Approach

Forensic tracking can be facilitated by watermarking each version or content copy with a transaction ID. Content is defined broadly herein and may include audio, video, data, images or multimedia combinations. A transaction (or dynamic) identifier preferably includes multi-bit data that uniquely identifies a user, a user device or a transaction. In some cases the transaction identifier serves as a database interrogator to retrieve additional information. (Forensic tracking involves identifying content and/or tracking a distribution source or history of the content. Forensic tracking can also involve uniquely serializing content to a user or user device. Forensic tracking is particularly helpful in identifying content or a distribution source when the content is discovered in an unexpected or unauthorized channel or location.). A content owner may want a serial account of each content copy, or to tie the content to an end-user or playing device ID. This requirement means that the content is preferably watermarked on the fly at the server with video streamed over IP, or at a set-top box (STB) in broadcast video system.

Some robust watermark embedding algorithms are too computationally intensive for this approach and/or adversely degrade content. For broadcast video, a set-top-box (STB) is designed to be as inexpensive as possible, but for use in a watermark embedding/decoding system, the STB must contain enough computational resources for a watermark embedder and/or decoder. For video streamed over IP, compressed content is often digitally watermarked on a server, which may require the content to be decompressed, watermarked and re-compressed. These steps are not only computationally intense but may also degrade the content.

Looking at a complete system, we have invented improvements for efficiently embedding a transaction ID in content. Our improvements are discussed below.

Watermarking Compressed Content

Digitally watermarking compressed audio, video or images, where a watermark ID can dynamically change (e.g., potentially to identify a user, transaction or requesting/rendering device), presents computational and content degradation (due to a re-compression) challenges. Conventional approaches often require content to be decompressed, watermark and recompressed.

Our improvements and solutions to these challenges are expressed in the following two embodiments.

First Embodiment

Our first embodiment is discussed with reference to FIG. 2. Compressed content 100 is decompressed 110. A watermark including a dynamic identifier 140 is determined (or constructed) for the decompressed content 120. Preferably, a dynamic identifier (or transaction identifier) uniquely identifies a particular user or user device. Or the dynamic identifier can be unique to a particular transaction in a receipt-like manner. Optionally, the dynamic identifier is associated in a database with additional information such as user information, distribution channel, content usage rights, transaction details, account information, etc. (Once decoded, the dynamic identifier is used to interrogate the database to retrieve the additional information.). The watermark is compressed as a separate object 130, such as defined in MPEG-4, without being embedded in the decompressed content. Two objects—namely the original compressed content and the compressed watermark—are communicated to a rendering device (e.g., personal computer, media player, set-top-box, DVD, or other consumer device) 150. In one example, a copy of the original compressed content 100 is retained, so as to avoid recompressing the decompressed original content. The objects can be communicated via a network, such as the Internet or a LAN or WAN. In a network environment, steps 100-140 are preferably carried-out on a network server.

The rendering device combines the two objects 160. For example, the objects can be decompressed and the content can be embedded with the watermark by a watermark embedder associated with the rendering device. The watermark object can include embedding hints, such a spatial or frequency-embedding clues, start sequences or points, etc. Or the two objects can be associated or linked together, e.g., with a header or file structure. Still further, the content and watermark can be otherwise combined, e.g., during rendering or storing.

The first embodiment associates a dynamic ID with content without recompressing the original content. The decompressed content 110 can be optionally saved on the network server so that the decompressing step is skipped for following transactions involving the same original content, thus reducing computational requirements.

Although not required, it is preferable that the two objects, i.e., the original compressed content and the compressed watermark, are delivered as a secure stream to a secure player (or rendering device) so that a would-be pirate cannot restrict or separate the watermark from the content.

Second Embodiment

Figure 2:
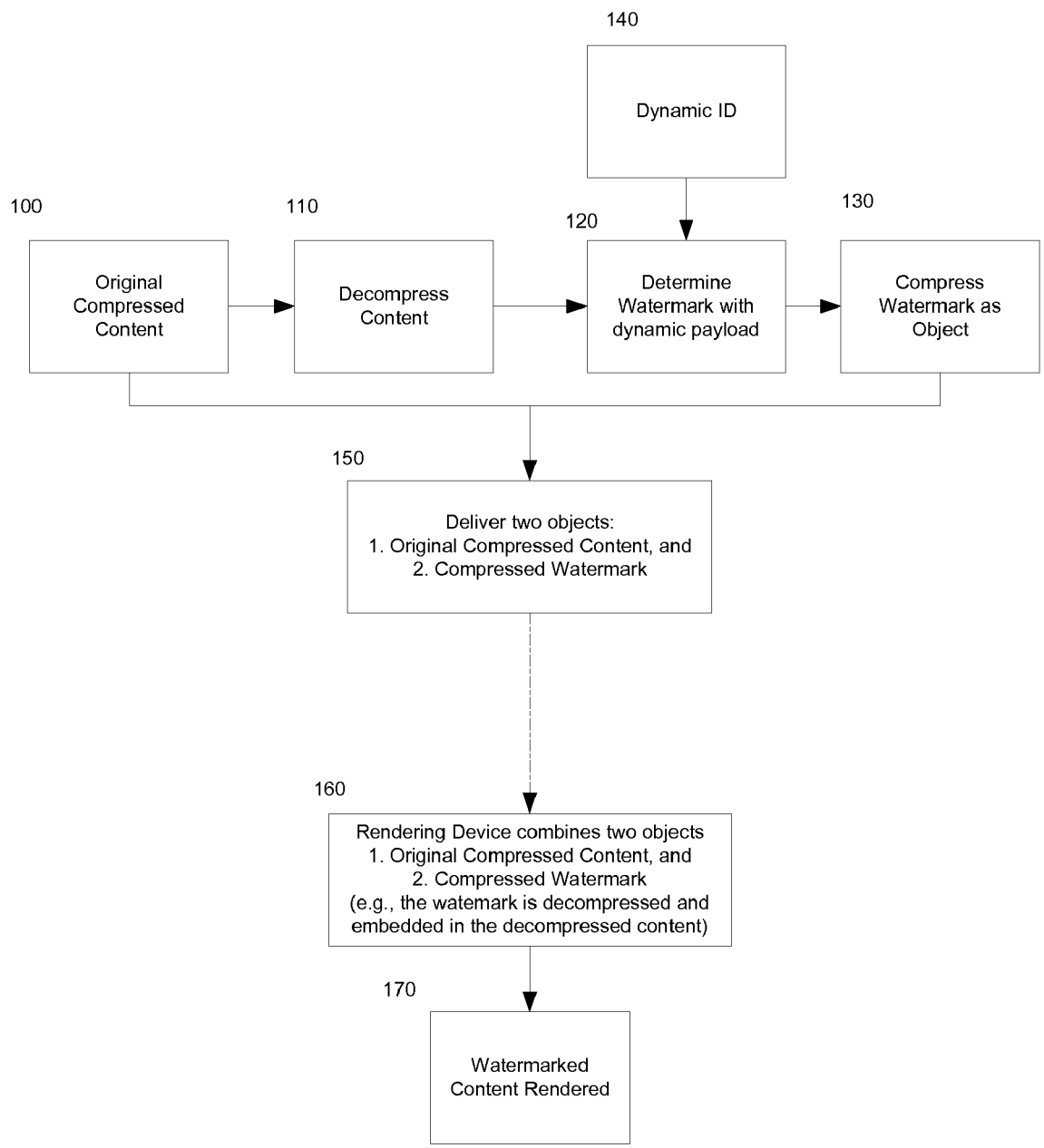
FIG. 2 is a block diagram illustrating a transaction procedure.

Our second embodiment is described with reference to FIG. 3, where like stages/steps are numbered with the same reference numbers as shown in FIG. 2. This embodiment includes a pre-computation stage, where original compressed content 100 is decompressed 110. Static watermark features and/or embedding instructions are determined 220. For example, the static watermark signal many include features based on perceptual modeling of the content, or may include watermark orientation or reference signals. The watermark features (e.g., perceptual model and/or orientation signal) are saved in a related file 230. Preferably, the related file contains those watermarking features that do not change when the transactional (or dynamic) ID changes. With these features saved in related file 230, the original content does not need to be again de-compressed. Overall computational time can be reduced by saving such a related file in the pre-computational stage. This related file 230 is preferably saved for future requests for the same original content 100, saving additional computational time.

Then, in a transaction stage, where the content 100 is delivered to a user, a watermark is efficiently created 120 using the related file 230 (including the perceptual model and/or orientation signal). The watermark preferably includes a watermark identifier based on a dynamic ID 140. As in the first embodiment, the dynamic or transactional ID uniquely identifies the user, user device or the transaction. The watermark is compressed 130 and sent as an object with the original compressed content 150 as discussed above with respect to FIG. 2. As such, in the transaction stage, the original compressed file need not be decompressed. In other words, the content file needs to be decompressed and analyzed for perceptual features only once, while the distributed versions can be watermarked with numerous IDs.

Additionally, in step 160, the watermark can efficiently be read before being added to the content. This reading will be very efficient and robust. Even if the watermark is read after being combined with the content, the watermark ID can be used to produce so-called hot-branding, where a related central database produces a dynamic brand logo to appear with the content, such as a logo in video or images and audio with audio.

Modifications

We also envision that the original compressed content may be encrypted. When encrypted, decryption does not have to be performed, except initially in the pre-computational stage when the related file 230 is created. This is both more efficient and more secure than having to decrypt the content to add the watermark during each subsequent transaction. As with the first embodiment, if the decompressed content is saved, the system is more efficient, but not necessarily more secure since non-secure content is available on the server.

Figure 3:
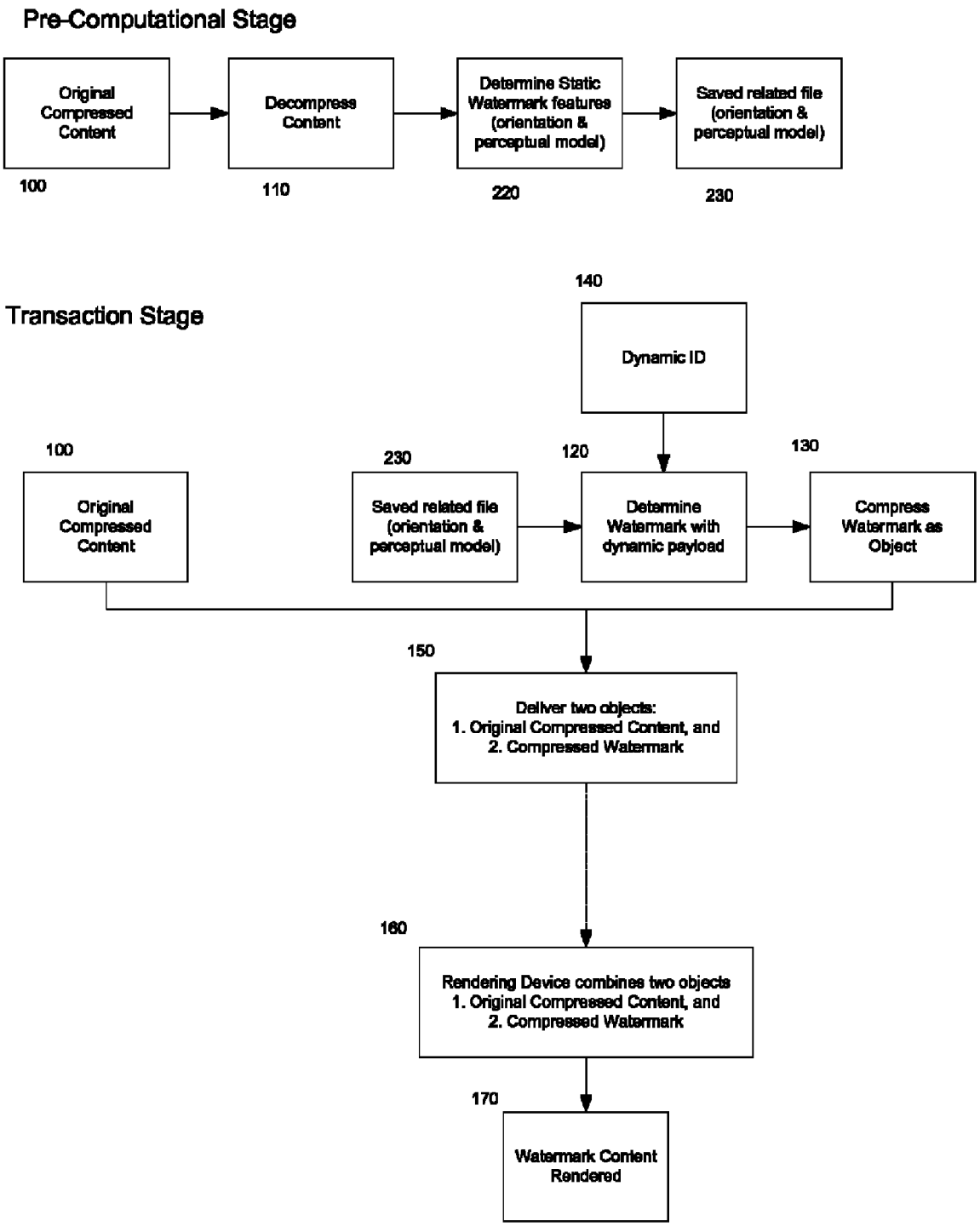
FIG. 3 is a block diagram illustrating another transaction procedure, include a pre-computational stage.

As an optional feature for the FIG. 2 and FIG. 3 embodiments, the content is embedded with a watermark content ID, and optionally with a distributor ID, before it is broadcast or streamed. This process need only occur once and not each time it is streamed. For example, a watermark-embedding step is included after decompression 110. Or the illustrated transaction processes act on compressed content that has been previously watermarked. The individual dynamic or transaction ID is then determined according to the FIG. 2 and FIG. 3 embodiments.

As will be appreciated, in the FIG. 2 and FIG. 3 embodiments, the original content and watermark objects are securely combined at a rendering device, thus creating a uniquely identified content display (e.g., such as a video display).

It also should be appreciated that the FIG. 2 and FIG. 3 transaction systems are envisioned to handle many transfers of the same original content to many different users (or rendering devices). A unique dynamic or transaction identifier is preferably generated for each transfer or for each user.

With reference to FIG. 2, in an alternative embodiment, the original content 100 includes a digital watermark, and the watermark is extracted and supplemented with a dynamic (or transactional) identifier in step 120.

CONCLUSION

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, each of the above-mentioned patents and patent applications, along with U.S. patent application Ser. Nos. 09/574,668 (now U.S. Pat. No. 6,522,769), 09/620,019 (now U.S. Pat. No. 7,689,532), 09/636,102, 60/257,822, and 09/574,668 (now U.S. Pat. No. 6,522,769), are hereby incorporated by reference. Applicants also herein incorporate by reference Assignee's U.S. patent application Ser. No. 10/277,617, published as US 2003-0103645 A1; now U.S. Pat. No. 7,224,819. The particular combinations of elements and features in the above-detailed embodiments are exemplary only; the interchanging and substitution of these teachings with other teachings in this application and the incorporated-by-reference patents/applications are expressly contemplated.

Many of the above-described methods and related functionality can be facilitated with computer executable software stored on computer readable media, such as electronic memory circuits, RAM, ROM, EPROM, flash memory, magnetic media, optical media, magnetic-optical media, memory sticks, hard disks, removable media, etc., etc. Such software may be stored and/or executed on a general-purpose computer, or on a server for distributed use. Also, instead of software, a hardware implementation, or a software-hardware implementation can be used.

While the first aspect of the present invention has been described with respect to editor rough-cuts, the invention is not so limited. Indeed, any movie segment, trailer, preview, or confidential documents can be watermarked. Also, while the rough-cuts are described as if in a digital format, they need not be so. Instead, the rough-cuts can be film, which includes a digital watermark identifier embedded therein. It also should be appreciated that the watermark embedding can occur while the rough-cut is being rendered.

Also, a studio rough-cut can include a plurality of watermarks. For example, the rough-cut may include a content identifying watermark, which uniquely identifies the content, and a user specific watermark, which uniquely identifies the user. The studio rough-cut can also include a so-called semi-fragile digital watermark. A semi-fragile watermark is designed such that it can withstand routine signal processing (e.g., compression) but is destroyed or degrades predictably with a malicious attack. The status of a fragile watermark in a studio rough-cut will help to announce a copy.

In view of the wide variety of embodiments to which the principles and features discussed above can be applied, it should be apparent that the detailed embodiments are illustrative only and should not be taken as limiting the scope of the invention.

What is claimed is:

1. A method comprising:
   receiving a copy of a compressed audio or video file;
   decompressing the compressed audio or video file to yield decompressed audio or video content;
   analyzing the decompressed audio or video content to determine watermarking criteria or watermark embedding instructions for the decompressed audio or video content, wherein the watermarking criteria includes information associated with an auxiliary watermark orientation signal or with an auxiliary watermark reference signal, and wherein the auxiliary watermark signals are separate from the audio or video file;

providing, to a remote location, the watermarking criteria or watermark embedding instructions in association with a request to obtain a copy of the compressed audio or video content.

2. The method of claim 1, wherein the watermarking criteria comprises information associated with a perceptual model of the audio or video content.

3. The method of claim 1, wherein the watermarking criteria comprises audio or video features that are more resilient to changes relative to other audio or video features.

4. A method comprising:
receiving a copy of a compressed audio or video file;
decompressing the compressed audio or video file to yield decompressed audio or video content;
analyzing the decompressed audio or video content to determine watermarking criteria or watermark embedding instructions for the decompressed audio or video content;
providing the watermarking criteria or watermark embedding instructions in association with a request to obtain a copy of the compressed audio or video content;
obtaining a plural-bit identifier that is uniquely associated with a requestor of the copy of the compressed audio or video file or a device of the requestor; and
combining the watermarking criteria or watermark embedding instructions and the plural-bit identifier to yield a combined watermark signal.

5. The method of claim 4, further comprising compressing the combined watermark signal as an object.

6. The method of claim 5, further comprising providing the compressed, combined watermark signal object and the compressed audio or video file.

7. A non-transitory computer-readable medium having instructions stored thereon, the instructions comprising:
instructions to receive a copy of a compressed audio or video file;
instructions to decompress the compressed audio or video file to yield decompressed audio or video content;
instructions to analyze the decompressed audio or video content to determine watermarking criteria or watermark embedding instructions for the decompressed audio or video content, wherein the watermarking criteria includes information associated with an auxiliary watermark orientation signal or with an auxiliary watermark reference signal, and wherein the auxiliary watermark signals are separate from the audio or video file; and
instructions to provide, to a remote location, the watermarking criteria or watermark embedding instructions in association with a request to obtain a copy of the compressed audio or video content.

8. A non-transitory computer readable medium having instructions stored thereon, the instructions comprising:
instructions to receive a copy of a compressed audio or video file;
instructions to decompress the compressed audio or video file to yield decompressed audio or video content;
instructions to analyze the decompressed audio or video content to determine watermarking criteria or watermark embedding instructions for the decompressed audio or video content;
instructions to provide the watermarking criteria or watermark embedding instructions in association with a request to obtain a copy of the compressed audio or video content;

instructions to obtain a plural-bit identifier that is uniquely associated with a requestor of the copy of the compressed audio or video file or with a device of the requestor; and
instructions to combine the watermarking criteria or watermark embedding instructions and the plural-bit identifier to yield a combined watermark signal.

9. A method comprising:
obtaining a copy of a compressed audio or video file;
decompressing the compressed audio or video file to yield decompressed audio or video content;
determining a watermarking component for the decompressed audio or video content, wherein the watermarking component is steganographically hidden in the audio or video content, wherein the watermarking component includes information associated with an auxiliary watermark orientation signal or with an auxiliary watermark reference signal, and wherein the auxiliary watermark signals are separate from the audio or video file;
storing the digital watermarking component separately from the compressed audio or video file; and
providing the stored watermarking component, a unique plural-bit watermark identifier, and the compressed audio or video file to a remote location.

10. A method comprising:
obtaining a copy of a compressed audio or video file;
decompressing the compressed audio or video file to yield decompressed audio or video content;
determining a watermarking component for the decompressed audio or video content, wherein the watermarking component is steganographically hidden in the audio or video content;
storing the digital watermarking component separately from the compressed audio or video file;
combining the watermarking component and a unique plural-bit watermark identifier;
compressing the combined watermarking component and the unique plural-bit watermark identifier to form a watermark object; and
providing the watermark object and the compressed audio or video file to a remote location.

11. The method of claim 9, wherein the watermarking component is based at least in part on a perceptual model of the decompressed audio or video content.

12. A non-transitory computer-readable medium having instructions stored thereon, the instructions comprising:
instructions to obtain a copy of a compressed audio or video file;
instructions to decompress the compressed audio or video file to yield decompressed audio or video content;
instructions to determine a watermarking component for the decompressed audio or video content, wherein the watermarking component is steganographically hidden in the audio or video content, wherein the watermarking component includes information associated with an auxiliary watermark orientation signal or with an auxiliary watermark reference signal, and wherein the auxiliary watermark signals are separate from the audio or video file;
instructions to store the digital watermarking component separately from the compressed audio or video file; and
instructions to provide the stored watermarking component, a unique plural-bit watermark identifier, and the compressed audio or video file to a remote location.

13. A non-transitory computer-readable medium having instructions stored thereon, the instructions comprising:

instructions to obtain a copy of a compressed audio or video file;
instructions to decompress the compressed audio or video file to yield decompressed audio or video content;
instructions to determine a watermarking component for the decompressed audio or video content, wherein the watermarking component is steganographically hidden in the audio or video content;
instructions to store the digital watermarking component separately from the compressed audio or video file;
instructions to combine the watermarking component and a unique plural-bit watermark identifier;
instructions to compress the combined watermarking component and the unique plural-bit watermark identifier to form a watermark object; and
instructions to provide the watermark object and the compressed audio or video file to a remote location.

14. A device comprising:
a memory; and
a processor operatively coupled to the memory and configured to:
  receive a copy of a compressed audio or video file;
  decompress the compressed audio or video file to yield decompressed audio or video content;
  analyze the decompressed audio or video content to determine watermarking criteria or watermark embedding instructions for the decompressed audio or video content, wherein the watermarking criteria includes information associated with an auxiliary watermark orientation signal or with an auxiliary watermark reference signal, and wherein the auxiliary watermark signals are separate from the audio or video file;
  store the watermarking criteria or watermark embedding instructions for the decompressed audio or video content in the memory; and
  provide, to a remote location, the watermarking criteria or watermark embedding instructions in association with a request to obtain a copy of the compressed audio or video content.

15. A device comprising:
a memory; and
a processor operatively coupled to the memory and configured to:
  receive a copy of a compressed audio or video file;
  decompress the compressed audio or video file to yield decompressed audio or video content;
  analyze the decompressed audio or video content to determine watermarking criteria or watermark embedding instructions for the decompressed audio or video content;
  provide the watermarking criteria or watermark embedding instructions in association with a request to obtain a copy of the compressed audio or video content;
  obtain a plural-bit identifier that is uniquely associated with a requestor of the copy of the compressed audio or video file or a device of the requestor; and
  combine the watermarking criteria or watermark embedding instructions and the plural-bit identifier to yield a combined watermark signal.

16. A device comprising:
a memory; and
a processor operatively coupled to the memory and configured to:
  obtain a copy of a compressed audio or video file;
  decompress the compressed audio or video file to yield decompressed audio or video content;
  determine a watermarking component for the decompressed audio or video content, wherein the watermarking component is steganographically hidden in the audio or video content, wherein the watermarking component includes information associated with an auxiliary watermark orientation signal or with an auxiliary watermark reference signal, and wherein the auxiliary watermark signals are separate from the audio or video file;
  store the first digital watermarking component separately from the compressed audio or video file in the memory; and
  provide the stored watermarking component, a unique plural-bit watermark identifier, and the compressed audio or video file to a remote location.

17. A device comprising:
a memory; and
a processor operatively coupled to the memory and configured to:
  obtain a copy of a compressed audio or video file;
  decompress the compressed audio or video file to yield decompressed audio or video content;
  determine a watermarking component for the decompressed audio or video content, wherein the watermarking component is steganographically hidden in the audio or video content;
  store the first digital watermarking component separately from the compressed audio or video file in the memory;
  combine the watermarking component and a unique plural-bit watermark identifier;
  compress the combined watermarking component and the unique plural-bit watermark identifier to form a watermark object; and
  provide the watermark object and the compressed audio or video file to a remote location.

* * * * *

UNITED STATES PATENT AND TRADEMARK OFFICE
CERTIFICATE OF CORRECTION

| | |
|---|---|
| PATENT NO. | : 8,000,495 B2 |
| APPLICATION NO. | : 12/251362 |
| DATED | : August 16, 2011 |
| INVENTOR(S) | : Levy et al. |

It is certified that error appears in the above-identified patent and that said Letters Patent is hereby corrected as shown below:

Column 9, line 54, in Claim 8, delete "computer readable" and insert -- computer-readable --.

Signed and Sealed this
Seventeenth Day of April, 2012

David J. Kappos
*Director of the United States Patent and Trademark Office*